United States Patent

[11] 3,632,344

| [72] | Inventors | Roland Moraw;<br>Johannes Munder, both of Wiesbaden-Bierbrich; Gerhard Lohaus, Kelkheim, Taunus, all of Germany |
|---|---|---|
| [21] | Appl. No. | 791,516 |
| [22] | Filed | Jan. 15, 1969 |
| [45] | Patented | Jan. 4, 1972 |
| [73] | Assignee | Keuffel & Esser Company<br>Morristown, N.J. |
| [32] | Priority | Jan. 17, 1968 |
| [33] | | Germany |
| [31] | | P 16 68 358.2 |

[54] DIAZO-TYPE MATERIAL USING ALPHA-PYRONE ULTRAVIOLET RADIATION ABSORBERS
9 Claims, No Drawings

[52] U.S. Cl. ..................................................... 96/91, 96/75, 96/84, 96/49
[51] Int. Cl. ......................................................... G03c 1/60
[50] Field of Search ............................................. 96/91, 75, 84, 49

[56] References Cited
UNITED STATES PATENTS

| 2,374,563 | 4/1945 | Reichel | 96/91 |
|---|---|---|---|
| 2,378,583 | 6/1945 | Schmidt | 96/91 |
| 2,542,849 | 2/1951 | Von Glahn et al. | 96/91 |
| 3,069,268 | 12/1962 | Herrick | 96/75 X |
| 3,303,028 | 2/1967 | Aebi et al. | 96/49 X |
| 3,365,293 | 1/1968 | Haefeli et al. | 96/49 X |
| 3,365,296 | 1/1968 | Cox et al. | 96/91 |

FOREIGN PATENTS

| 6,413,561 | 5/1965 | Netherlands | 96/91 |

OTHER REFERENCES
Lohaus et al., Chem. Ber., Vol. 100, 2/1967, pp. 658–664.

*Primary Examiner*—Charles L. Bowers, Jr.
*Attorneys*—J. Russell Juten, Peter F. Willig, Lionel N. White and Milford A. Juten ABSTRACT: Alpha-pyrone compounds are employed to provide colorless, lightfast ultraviolet radiation absorber materials. In addition to being normally colorless these materials are noncoloring due to their colorless decomposition products. The materials provide barriers for protection from ultraviolet radiation, and when incorporated in diazo-type reproduction materials, provide broad tonal gradations. Alpha-pyrones including an azocoupling group in the molecule may be combined with light-sensitive diazonium compounds to provide two-component diazo-type material without the inclusion of additional azocoupler compounds.

DIAZO-TYPE MATERIAL USING ALPHA-PYRONE ULTRAVIOLET RADIATION ABSORBERS

BACKGROUND OF THE INVENTION

So-called ultraviolet absorbers are known and employed to a large extent in technical products. They are embedded in films, for example, by adding them to the casting solution in the preparation of cast films, or by subsequently incorporating them into the film by diffusion application from a solution, or by applying them in a separate layer as an addition to lacquers. The ultraviolet absorbers also may be incorporated by polymerization when they are added to the monomer mixture; and they also may be extruded with thermoplastic material.

Generally, the ultraviolet absorbers are employed to protect various materials from the known adverse effects of ultraviolet light rich in energy. They are thus often employed in packaging, e.g. to protect foodstuffs from the action of light. Also bleaching of dyed textiles or fading of prints or colored photographs may be avoided by the use of such absorbers. Ultraviolet absorbers often are added to plastics materials in order to reduce embrittlement or yellowing caused by the action of light. Furthermore, ultraviolet absorbers may cause special optical effects. When certain ultraviolet absorbers are incorporated into transparent diazotype material, for example, a flatter gradation of the reproduction material is achieved.

The multiple fields of application reveal the demands made of a universally employable ultraviolet absorber. It must be "-colorless" in order not to adulterate the visual color impression. Therefore, contrary to the so-called brightening agents, it should not fluoresce. It should have a good fastness to light. If, however, it slightly decomposes in the course of time, the decomposition product itself should also be colorless. It is furthermore desirable for the ultraviolet absorber to be chemically inert, to be easily processed and to be easily prepared.

The hitherto known ultraviolet absorbers, e.g. polynuclear aromatic hydrocarbons, aromatic keto compounds and the like have the disadvantage that they do not consistently satisfy one or another demand made of them. A considerable number of them are fluorescent, many of them absorb in the visible spectral range, whereas others absorb too little in the longer wave ultraviolet range. Other compounds, e.g. the pyrazoline derivatives described in Belgian Pat. No. 688,795, are excellently suitable for certain purposes in the diazotype field due to their characteristics, but can only be prepared in a relatively cumbersome manner.

SUMMARY OF THE INVENTION

The present invention provides for ultraviolet absorption the use of compounds of general structural formula A below, wherein
$R_1$ stands for hydrogen, halogen, an alkyl, alkenyl, cyanide, carboxylic acid, carboxylic acid ester, or carboxylic acid amide group,
$R_2$ stands for hydrogen or an alkyl group,
$R_3$ stands for hydrogen or an alkyl group linked to an alkyl radical $R_4$ with ring closure,
$R_4$ stands for hydrogen, halogen, an alkyl, sulphonic acid, sulphonic acid chloride, or sulphonic acid amide group, and
$R_5$ stands for hydrogen, halogen, or an alkyl group,
the carboxylic acid or sulphonic acid amides deriving from ammonia, an aliphatic, cycloaliphatic or aromatic amine or a heterocyclic nitrogen compound, which may carry further substituents, and an alkyl group $R_1$ as an alkylene group, being able to link two molecule residues of Formula A.

Formula A

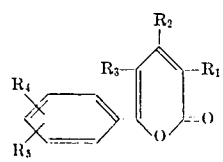

Particularly preferable compounds to be used in accordance with the invention are such as have an absorption maximum in the range from about 340 to 350 nm.

The ultraviolet absorbers provided by the present invention may particularly be used in light-sensitive reproduction materials having transparent supports.

For this special purpose of application, also such compounds of the above structure are particularly suitable as contain in the molecule a grouping causing coupling with a diazocompound.

The compounds to be used in accordance with the invention excellently fulfill the above requirements so that they generally can be used as ultraviolet absorbers. According to the requirements, they absorption correspondingly starts at about 400 nm. and increases towards the shortwave spectral range to a maximum being generally at about 345 mm. Since absorption starts exactly at the boundary between the visible and the ultraviolet spectral ranges, the 6-phenyl-α-pyrones used in accordance with the invention appear colorless upon visual view. Furthermore, it has been found that they remain very fast to light even after exposure to a xenon lamp for several days; decompositions, if occuring at all, do not lead to dyed decomposition products. The compounds do not show a noticeable fluorescence.

The preparation of the compounds used in accordance with the invention is described in "Chemische Berichte" 100 (1967), pages 658–677. They can be prepared in this manner extraordinarily easily. Within the above limits, the substituents may be varied without the described optical properties being substantially changed. It is thus possible, by suitable selection of the substituents, to adapt the solubility or other properties to the purpose of use concerned.

PREFERRED EMBODIMENTS

Example 1

1 mg./ml. of 3-chloro-4-methyl-6-p-tolyl-pyrone-(2) (formula 1) is dissolved in a 10 percent casting solution of cellulose triacetate in a solvent mixture of equal parts of acetone and methylene chloride. A 0.15-mm.-thick cellulose acetate film cast with this solution appears colorless and is optically very clear, but absorbs in the ultraviolet spectral range between 400 and 300 nm. almost all incident light. The highquality lightfast film is suitable, for example, for covering images or prints, such as maps.

Example 2

A 0.05-mm.-thick cellulose triacetate film is soaked for 3 minutes with a 0.2 percent solution of the compound of formula 1 in glycol monomethyl ether and then superficially washed with glycol monomethyl ether and dried. The thus impregnated film absorbs almost all light in the near ultraviolet spectral range between 400 and 300 nm. It is suitable as a protective and packaging film. The ultraviolet absorber furthermore prevents the film from becoming prematurely brittle by the action of light.

Example 3

The procedure is the same as that described in examples 1 and 2 with the use of equal quantities of the compounds 3-bromo-4-methyl-6-(4-chloro-phenyl)-pyrone-(2) (formula 2) or 3-carbonamide- 4-methyl-6-phenyl-pyrone-(2)(formula 3) as the ultraviolet absorber. Similarly good results are achieved.

Example 4

A sheet of regenerated cellulose is soaked for 3 minutes in a 2 percent solution of 3-chloro-4-methyl-6-(4-sulfonic acid chloride-phenyl)-pyrone-(2) (formula 4) in equal parts of acetone and glycol monomethyl ether. The dried sheet is impermeable to light in the spectral range between 400 and 300 nm. and suitable as packaging material, e.g. for textiles.

Example 5

A sheet of regenerated cellulose is immersed for 3 minutes in a 0.5 percent aqueous solution of the compound of formula 5. Isopropanol is added as a dissolving intermediary. The dried sheet is impermeable to light in the spectral range between 400 and 300 nm. and suitable as a packaging material.

Example 6

Half of a wooden board is lacquered with the casting solution of example 1. The other half is lacquered with the same cellulose acetate solution but without an ultraviolet absorber. The half lacquered without the addition of the ultraviolet absorber becomes more rapidly yellow under light influence than does the other one.

Example 7

A cellulose acetate film having about 2.5 acetyl groups per glucose unit into which, according to example 2, an ultraviolet absorber has been incorporated is coated with a sensitizer solution of the following composition:

3 g. of citric acid,
1 g. of p-diazodiethylaniline, zinc chloride double salt,
3 g. of 2,3-dihydroxy-naphthalene-6-sulfonic acid (sodium salt) in 50 ml. of water, and
50 ml. of isopropanol.

The dried film is exposed to a mercury vapor lamp under a photographic step wedge with graduated shades of black (Kodak Photographic Step Tablet No. 2, density increment per step 0.15) and then developed with ammonia vapors to give a blue image. Compared to a similar sample but on a cellulose acetate film without an ultraviolet absorber more wedge steps are discerned, the radiation of the film material with the ultraviolet absorber has become flatter.

Example 8

A cellulose acetate film as described in example 7, but without an ultraviolet absorber is coated with the light-sensitive solution of example 7 with the addition of 0.5 g. of the compound of formula 5. The dried film is exposed and developed with ammonia vapors as described in example 7. By means of the addition of the ultraviolet absorber, a relatively soft-effect reproduction material is obtained. Example 7 describes the production of a soft-effect reproduction material with the use of a film provided with ultraviolet absorbers. Since the light-sensitive mass, as is known, penetrates into the cellulose acetate film only 0.01 mm., it is not necessary to homogeneously distribute the ultraviolet absorber in the film. It is sufficient, as described in example 8, to add the ultraviolet absorber to the coating solution so that only a superficial layer of the film is treated.

In some instances it has been observed that the ultraviolet absorber and the other constituents of a diazosensitizing coating solution diffuse into the supporting film to different degrees. Resulting difficulties are obviated, however, by using ultraviolet absorbers in accordance with the invention which contain a coupling grouping in the molecule, e.g. the compounds of formulas 5 to 11. Of these compounds, those of formulas 5 to 7 couple with diazonium compounds to give yellow and those of formulas 8 to 11 to give blue azodyestuffs.

Example 9

The compound of formula 4 is dissolved together with an equivalent quantity of 3-hydroxy-4-amino-toluene in chloroform and reacted with heating with the addition of sodium bicarbonate. 1.2 g. of the resulting compound of formula 6 are dissolved together with 3 g. of citric acid and 1 g. of p-diazo-diethyl aniline, zinc chloride double salt, in 50 ml. of water, 50 ml. of isopropanol, and 5 ml. of dimethyl formamide and applied to the support described in example 7. Exposure to light and development with ammonia vapors to give a yellow-brown image are carried out as described in example 7. More wedge steps are discerned than on a similar reproduction material but prepared with 0.7 g. of 2-hydroxy-4-methylphenyl urea instead of the compound of formula 6.

The following table shows the absorption data or melting points of the compounds used in accordance with the invention. The structural formulas of these compounds are listed below.

Formula 1
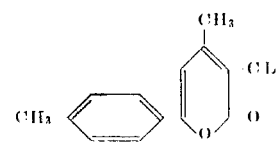

Formula 2
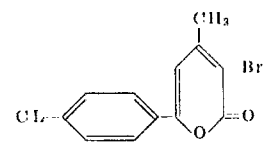

Formula 3
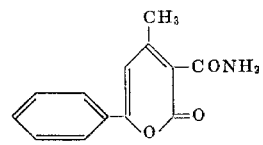

Formula 4
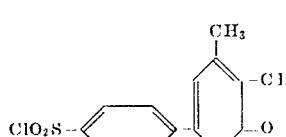

Formula 5
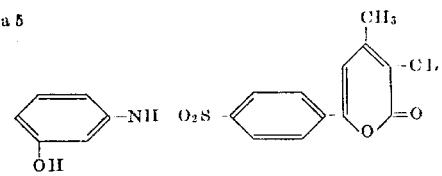

Formula 6
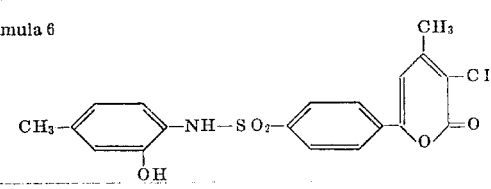

Formula 7
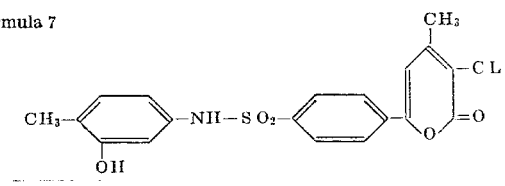

Formula 8
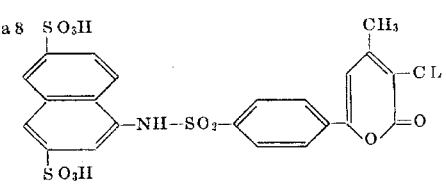

Formula 9
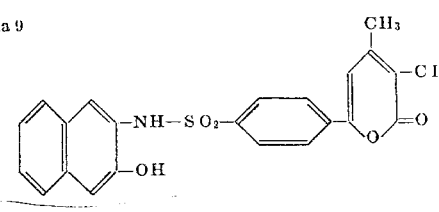

Formula 10
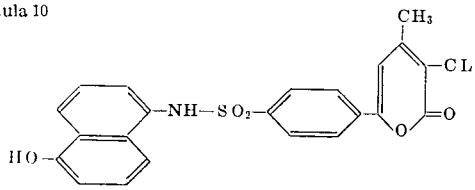
Formula 20
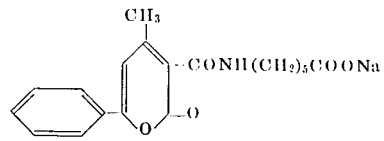
Formula 11
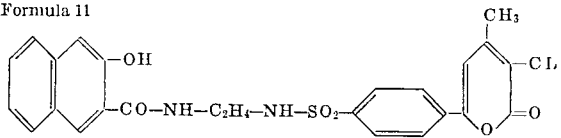
Formula 21
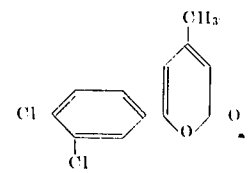
Formula 12
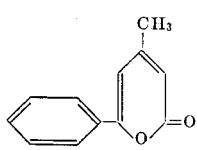
Formula 22
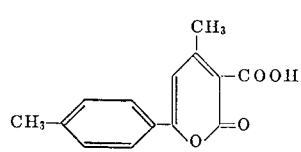
Formula 13
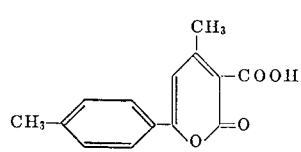
Formula 23
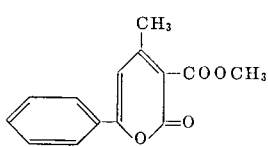
Formula 14
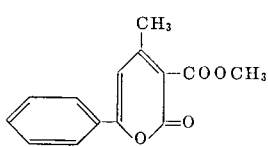
Formula 24
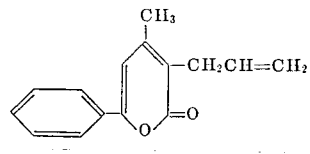
Formula 15
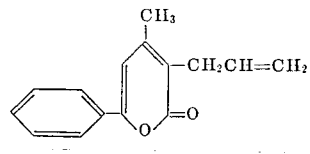
Formula 25
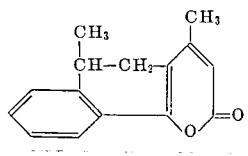
Formula 16
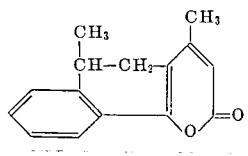
Formula 26
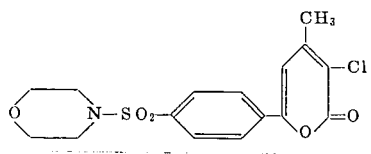
Formula 17
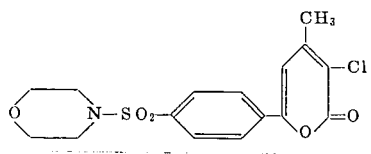
Formula 27
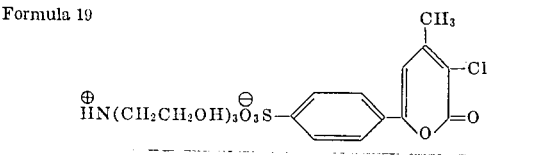
Formula 18
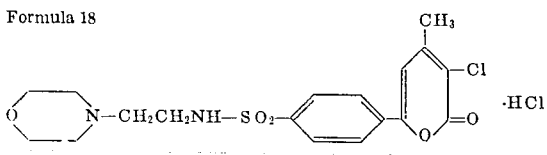
Formula 28
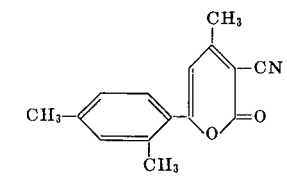
Formula 19
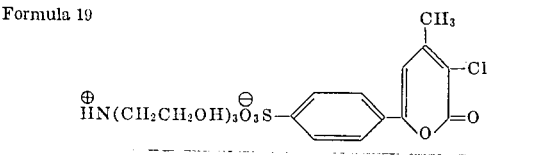

TABLE

| Formula Nr. | λ max, nm. | ε max cm./mol liter | Melting Point |
| --- | --- | --- | --- |
| 1 | 344 | 18,200 | — |
| 2 | 342 | 19,700 | — |
| 3 | 343 | 16,400 | — |
| 4 | 350 | 21,200 | — |
| 5 | 342 | 21,000 | — |
| 6 | — | — | 230°–232° C. |
| 7 | — | — | decomposes above 350° C. |
| 8 | — | — | |
| 9 | — | — | 244°–247° C. |
| 10 | — | — | decomposes |
| 11 | — | — | 275° C. (dec.) |
| 12 | 328 | 13,500 | — |
| 13 | 350 | 16,200 | — |
| 14 | 342 | 16,600 | — |
| 15 | 332 | 17,300 | — |
| 16 | 349 | 14,800 | — |
| 17 | 341 | 20,500 | — |
| 18 | 341 | 20,900 | — |
| 19 | 340 | 21,000 | — |
| 20 | 338 | 16,400 | — |
| 21 | 330 | 17,900 | — |
| 22 | 347 | 19,400 | — |
| 23 | 350 | 23,700 | — |
| 24 | 348 | 16,100 | — |
| 25 | 347 | 33,600 | — |
| 26 | 350 | 19,200 | — |
| 27 | 346 | 17,300 | — |
| 28 | 353 | 17,500 | — |

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Diazotype material comprising a support bearing a light-sensitive composition comprising a light-sensitive diazonium compound, an azocoupler compound, an acidic stabilizer and an ultraviolet light absorber selected from the group of pyrone compounds having the general formula:

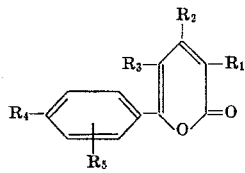

$R_1$ stands for hydrogen, halogen, an alkyl, alkenyl, cyanide, carboxylic acid, carboxylic acid alkyl ester, or carboxylic acid amide group, or an alkylene group linking two molecules of the general formula;

$R_2$ stands for hydrogen or an alkyl group;

$R_3$ stands for hydrogen or an alkyl group linked to an alkyl radical $R_5$ with ring closure;

$R_4$ stands for hydrogen, halogen, an alkyl, sulfonic acid, sulfonic acid chloride, or sulfonic acid amide group; and $R_5$ stands for hydrogen, halogen, or an alkyl group;

said carboxylic acid amide being derived from ammonia, an aliphatic amine, an aromatic amine, a cycloaliphatic amine having six carbon atoms, or a saturated five-membered heterocyclic nitrogen-containing compound, and said sulfonic acid amide being derived from ammonia, an aliphatic amine, an aromatic amine or a saturated six-membered heterocyclic nitrogen-containing compound, said aromatic ring of the aromatic amine that is used to form the sulfonic acid amide may have alkyl, hydroxy or sulfonic acid groups attached directly to said aromatic ring.

2. Diazotype material according to claim 1 wherein said composition comprises, as substantially the sole azocoupler compound, said ultraviolet light absorbing pyrone compound being of the general formula;

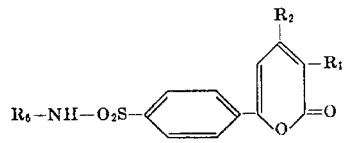

wherein:

$R_1$ stands for halogen;

$R_2$ stands for a lower alkyl; and $R_6$ stands for a phenol, cresol, or naphthol group, or a naphthol amido group bridged to the sulfonamido group by a lower alkylene group.

3. Diazotype material according to claim 1 wherein said azocoupler is other than a pyrone compound as described in claim 1.

4. Diazotype material according to claim 1 wherein said absorber is 3-bromo-4-methyl-6-(4-chloro-phenyl)-pyrone-(2).

5. Diazotype material according to claim 1 wherein said absorber is 3-carbonamide-4-methyl-6-phenyl-pyrone-(2).

6. Diazotype material according to claim 2 wherein said pyrone compound is 3-chloro-4-methyl-6-[4-(sulfonamido-3'-phenol)-phenyl]-pyrone-(2).

7. Diazotype material according to claim 2 wherein said pyrone compound is 3-chloro-4-methyl-6-[4-(sulfonamido-3'-hydroxy-4'-methyl-phenyl)-phenyl]-pyrone (2).

8. Diazotype material according to claim 2 wherein said pyrone compound is 3-chloro-4-methyl -6-[4-(sulfonamido-2'-naphthol)-phenyl]-pyrone (2).

9. Diazotype material according to claim 2 wherein said pyrone compound is 3-chloro- 4-methyl-6-[4-(sulfonamido-ethyl-2'-hydroxy-naphthoic acid amido)-phenyl]-pyrone (2).

* * * * *